United States Patent
Eckel et al.

(10) Patent No.: US 6,450,065 B1
(45) Date of Patent: Sep. 17, 2002

(54) SPEED-ADAPTIVE DYNAMIC-VIBRATION ABSORBER

(75) Inventors: Hans-Gerd Eckel, Laudenbach; Rainer Oberle, Hirschberg; Jörg Böcking, Darmstadt, all of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/351,508

(22) Filed: Jul. 12, 1999

(30) Foreign Application Priority Data

Jul. 11, 1998 (DE) .......................... 198 31 160

(51) Int. Cl.[7] .............................................. F16F 15/10
(52) U.S. Cl. ..................................................... 74/574
(58) Field of Search ............................. 74/573 R, 574; 464/180

(56) References Cited

U.S. PATENT DOCUMENTS

| | | | | |
|---|---|---|---|---|
| 4,944,279 A | * | 7/1990 | Woodard | 74/574 X |
| 5,819,598 A | * | 10/1998 | Cooke et al. | 74/574 |
| 5,884,735 A | * | 3/1999 | Eckel et al. | 74/574 X |
| 5,976,020 A | * | 11/1999 | Lohaus et al. | 74/574 X |
| 6,012,355 A | * | 1/2000 | Sudau | 74/574 |
| 6,012,559 A | * | 1/2000 | Yamamoto | 74/574 X |
| 6,067,876 A | * | 5/2000 | Lohaus | 74/574 |
| 6,109,134 A | * | 8/2000 | Sudau | 74/574 |

FOREIGN PATENT DOCUMENTS

| | | |
|---|---|---|
| DE | 36 33 584 | 4/1987 |
| DE | 196 31 989 | 9/1997 |

* cited by examiner

Primary Examiner—Charles A Marmor
Assistant Examiner—Roger Pang
(74) Attorney, Agent, or Firm—Kenyon & Kenyon

(57) ABSTRACT

A speed-adaptive dynamic-vibration absorber for a shaft rotatable about an axis, including a hub part on which at least one inertial mass is provided. The at least one inertial mass, starting from a middle position in which its center of gravity is the greatest distance from the axis, is moveable back and forth relative to the hub part along a path of motion in deflection positions in which the distance of the center of gravity of the at least one inertial mass changes with respect to the middle position, the path of motion having a radius of curvature which changes at least section-by-section with increasing deflection of the inertial mass out of the middle position.

19 Claims, 4 Drawing Sheets

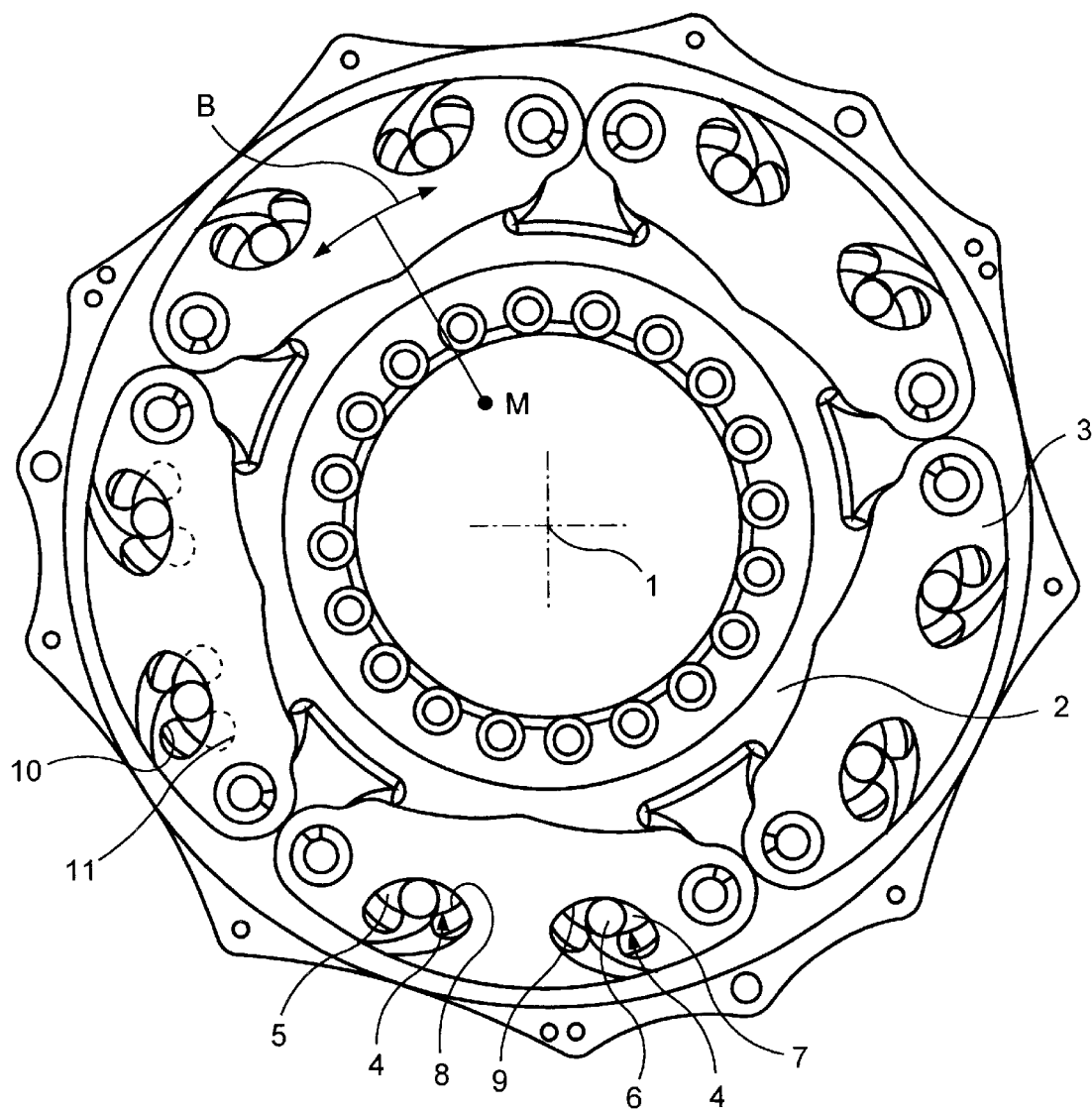
F I G. 1

SPEED-ADAPTIVE DYNAMIC-VIBRATION ABSORBER

FIELD OF THE INVENTION

The invention relates to a speed-adaptive dynamic-vibration absorber for a shaft rotatable about an axis, including a hub part on which at least one inertial mass is provided. The inertial mass, starting from a middle position in the distance from its center of gravity to the axis is at a maximum, is moveable back and forth relative to the hub part along a path of motion in deflection positions such that the distance of the center of gravity of the at least one inertial mass changes with respect to the middle position.

BACKGROUND OF THE INVENTION

Such a speed-adaptive dynamic-vibration absorber is described in the German Patent 196 31 989 C1.

At shafts of periodically operating machines, e.g., at the crank shaft of an internal combustion engine, torsional vibrations occur which are superimposed on the rotational motion, the frequency of the torsional vibrations changing with the rotational speed of the shaft. To reduce these torsional vibrations, dynamic-vibration absorbers can be provided. They are described as speed-adaptive when they can cancel torsional vibrations over a larger speed range, ideally over the entire speed range of the machine. The principle underlying torsional vibration cancellers is that, due to centrifugal force, the inertial masses endeavor to circle the axis at the greatest distance possible when a rotary motion is initiated. Torsional vibrations which are superimposed on the rotary motion lead to a pendulum-like relative movement of the inertial masses. The dynamic-vibration absorber has a natural frequency $f_{absorber}$ proportional to the rotational speed, so that torsional vibrations having frequencies which are proportional in the same manner to the shaft rotational speed n (in revolutions per second), can be canceled over a large speed range. Expressed mathematically, $f_{absorber}=x*n$ where x is the order of the exciting vibration. For example, in the case of a four-cylinder four-stroke engine, this has the value x=2. In the known dynamic-vibration absorber, the inertial masses move relative to the hub part in a purely translatory manner on circular paths of motion. However, the known speed-adaptive dynamic-vibration absorber has the disadvantage that it is still not possible, to achieve optimum canceling effectiveness over the entire speed range and load range.

SUMMARY OF THE INVENTION

The object of the present invention is to attain improved canceling effectiveness over a wide speed range and load range.

This objective is achieved in a speed-adaptive dynamic-vibration absorber of the type indicated above, in that the path of motion has a radius of curvature which changes at least section-by-section with increasing deflection of the inertial mass out of the middle position.

This design according to the invention permits improved canceling effectiveness. At the same time, the speed-adaptive dynamic-vibration absorber can be better adapted to the torsional vibrations to be canceled. The teaching of the present invention opens up a great, previously unknown leeway in the design of the dynamic-vibration absorber, permitting considerable improvement in absorbing dynamic vibrations.

Particularly effective absorption of dynamic vibrations is achieved, in that the radius of curvature decreases at least section-by-section with increasing deflection of the inertial mass out of the middle position.

According to one particularly advantageous refinement, the radius of curvature decreases continuously. In this manner, the path of motion receives a curvature which can be represented by a strictly monotonically increasing function.

Particularly effective dynamic-vibration absorption is also attained by providing a plurality of inertial masses adjacent in the circumferential direction.

Particularly large inertial masses can be provided on a small installation space if the inertial masses, adjacent in the circumferential direction, are rounded off at the ends facing one another, and are loosely in contact with one another, regardless of the deflection.

Further improvement is achieved, in that the radius of curvature of the path of motion in the middle position is determined by the formula $$R = k\frac{L}{x^2},$$

where L is the distance of the curvature midpoint from the axis, x is the order of the exciting vibration and k is a factor in the range from 0.8 to 1.2. In this context, the curvature midpoint represents the point of rotation of the inertial mass. The order x of the exciting vibration indicates the relationship between the vibrational frequency and the rotational speed (in revolutions per second). For example, in the case of a four-cylinder, four-stroke engine, x=2 is for the dominantly exciting firing order. Optimized vibrational damping can be achieved under the most varied conditions by varying k in the indicated range.

Advantageously, k lies in the range from 0.8 to 0.999 or 1.001 to 1.2.

Vibrational damping can be further improved by providing the path of motion with the shape of a cycloid section. A cycloid is a curve which develops when a circle rolls along on a straight line. A point fixedly joined to the circle at a distance from its midpoint describes a curve, composed of congruent pieces, as the circle rolls along on the straight line.

The tuneability of the dynamic-vibration absorber is further improved, in that the path of motion lies in a field which is bounded on the one hand by a circle whose radius of curvature is determined by the formula $$R = k\frac{L}{x^2},$$

where k=1.2, and on the other hand by a cycloid whose radius of curvature in the middle position is determined by the formula $$R = k\frac{L}{x^2},$$

where k=0.8. In this context, the circle and the cycloid are arranged in such a way that their paths coincide in the middle position. Good dynamic-vibration absorption can be attained by this arrangement of the paths of motion of the inertial masses located in a centrifugal force field. In this manner, it is possible to achieve a deflection-independent duration of the pendulum swing of the inertial masses that are moveable relative to the hub part. Thus, for example, in addition to the non-linearity of the swinging inertial masses, hydrostatic and hydrodynamic effects resulting from a lubricant can also be largely compensated.

In addition, the path of motion in a first section adjacent to the middle position can lie in a first region of the field, the first region being bounded on one hand by a circle whose radius of curvature is determined by the formula $$R = k\frac{L}{x^2},$$

where k=1.0, and on the other hand by the circle whose radius of curvature is determined by the formula $$R = k\frac{L}{x^2},$$

where k=1.2. At the same time, the circles are arranged in such a way that their paths coincide in the middle position.

According to a further aspect of this inventive idea, the path of motion in a second section, which is adjacent to the first section, lies in a second region of the field, the second region being bounded on one hand by the circle whose radius of curvature is determined by the formula $$R = k\frac{L}{x^2},$$

where k=1.0, and on the other hand by the cycloid whose radius of curvature in the middle position is determined by the formula $$R = k\frac{L}{x^2},$$

where k=0.8. The circle and the cycloid are arranged in such a way that their paths coincide in the middle position. This design of the path of motion, which is different region-by-region, opens up new possibilities for further optimizing the damping under the most varied conditions.

According to one advantageous refinement of the invention, the at least one inertial mass is supported in the hub part by axially parallel bolts that are rotatable about a bolt axis, the bolts being allocated to first rolling paths (i.e., rolling curves) of the hub part and second rolling paths of the inertial mass.

In a further embodiment based on this invention, given an identical formation of the rolling paths of the inertial mass and the hub part, a point exists, allocated to the inertial mass, which shifts with the inertial mass along the path of motion, and whose distance in the middle position of the inertial mass is twice as great from the curvature midpoint, allocated to the middle position, of the path of motion of the point as the distance of the point from the bolt axis. The first and second rolling paths are designed in such a way that, in each deflection position, the bolt axis is located on the geometric center of an imaginary connecting line between the curvature midpoint, allocated to the middle position, and each point of the path of motion of the point. By this means, it is specified how the rolling paths upon which the bolts roll are to be constructed in order to achieve good vibrational damping.

BRIEF DESCRIPTION OF THE DRAWING

FIG. 1: is a front view of a speed-adaptive dynamic-vibration absorber constructed according to the principles of the invention;

DETAILED DESCRIPTION OF THE INVENTION

Figure 2:
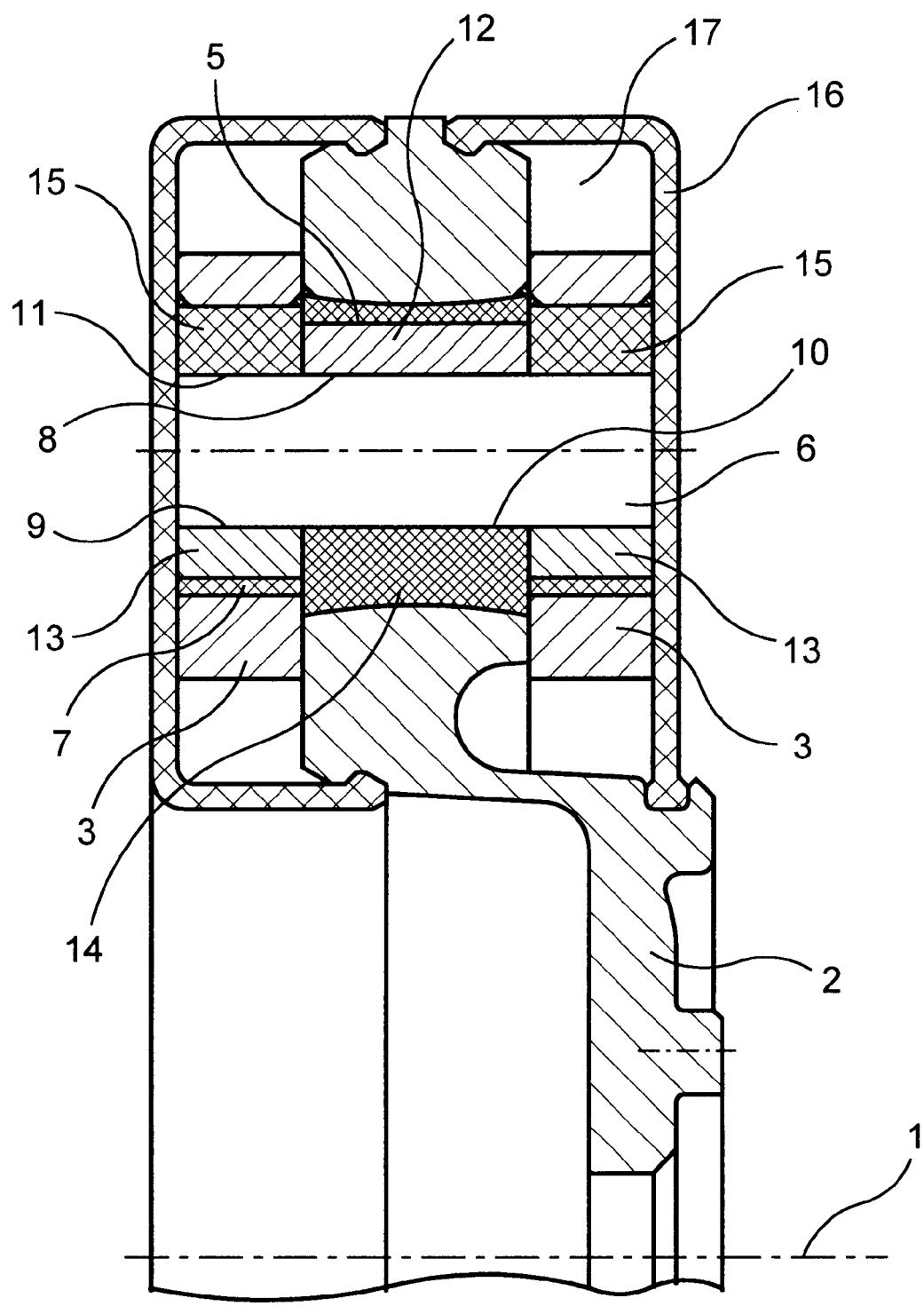
FIG. 2: is a cross-sectional view taken through a speed-adaptive dynamic-vibration absorber.

FIG. 1 shows a speed-adaptive dynamic-vibration absorber for a shaft (not shown) rotatable about an axis 1, the dynamic-vibration absorber having a hub part 2 and a number of inertial masses 3 adjacent in the circumferential direction. For each inertial mass 3, hub part 2 has in each case two mounting supports 4 adjacent in the circumferential direction to support inertial masses 3 on hub part 2.

Each mounting support 4 is formed by an opening 5 in hub part 2 and a bolt 6 accommodated therein. Bolt 6, whose longitudinal axis runs parallel to axis 1 of hub part 2, extends into an opening 7 formed in particular as a cut-out in inertial mass 3.

Hub part 2 has a rolling path 8 bordering opening 5, and inertial mass 3 has a rolling path 9 bordering opening 5. Rolling paths 8,9 and bolt 6 are formed and arranged in such a way that inertial mass 3, starting from a middle position in which the distance of its center of gravity to the axis 1 is at a maximum, is moveable back and forth relative to hub part 2 along a path of motion B in deflection positions. During such a pendulum motion of inertial masses 3 taking place in the centrifugal force field, the center of gravity of inertial masses 3 in the deflection positions approaches axis 1. During a movement of inertial masses 3 between the deflection positions, bolts 6 hob on rolling paths 8,9 which are inversely curved. Rolling path 8 in the hub part points in the direction of axis 1, while rolling path 9 in inertial mass 3 points outwardly away from axis 1.

In response to a torsional vibration superimposed on a rotational motion, inertial masses 3 are moved from their mid position, shown in FIG. 1, relative to hub part 2 along curved path of motion B. In so doing, each inertial mass 3 carries out a translatory movement relative to hub part 2, so that each point of rigid inertial mass 3, particularly its center of gravity, shifts along an identical path of motion B.

In addition, in openings 7, inertial masses 3 have guideways 10 lying opposite rolling paths 9, so that openings 7 assume the shape of a U which is directed away from axis 1. Corresponding guideways 11 are formed in mounting support 4 of hub part 2, as well (shown in phantom in FIG. 1).

The circumferentially adjacent inertial masses are rounded off at the ends facing one another, and loosely contact one another independently of the deflection.

The cross-section along axis 1 shown in FIG. 2 further elucidates the arrangement and mounting of inertial masses 3 on hub part 2. In the specific embodiment shown in FIG. 2, inertial masses 3 are adjacently arranged in pairs axially on both sides of hub part 2.

Rolling paths 8,9 are components of inserts 12,13 which are undetachably accommodated in openings 5 and 7 of hub part 2 and inertial mass 3, respectively. Inserts 12,13 can also be loosely inserted into openings 5 and 7 at first, and be bonded at openings 5 and 7 and inserts 12 and 13, respectively by subsequent molding of layer 14,15 bearing guideways 10,11.

The section of hub part 2 having mounting supports 4 is enclosed by caps 16 that are sealed off with respect to hub part 2, so that a chamber 17 is formed. This is filled to a small extent with a lubricant. Lubricating liquids such as lubricating oils or lubricating grease can be considered as lubricants.

Figure 3:
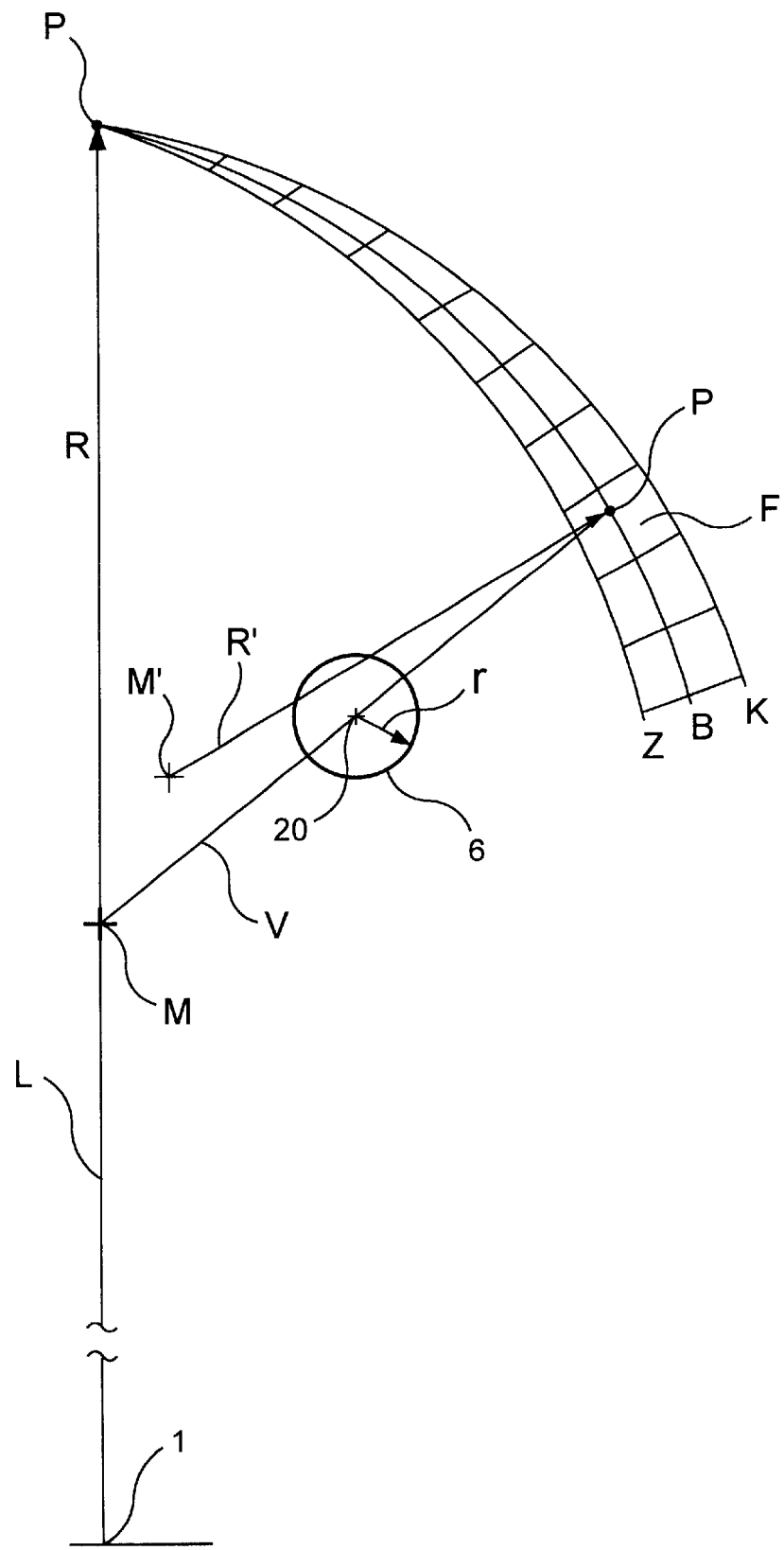
FIG. 3: is a schematic representation of the paths of motion executed by elements of the invention in the course of operation.
Figure 4:
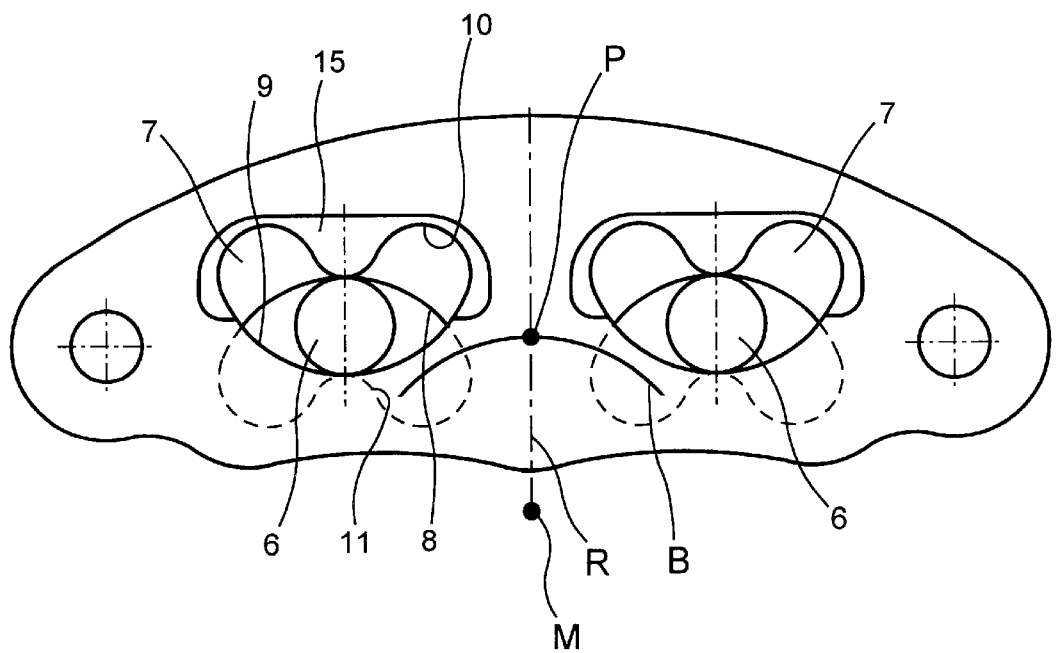
FIG. 4: illustrates an inertial mass according to the present invention.
Figure 5:
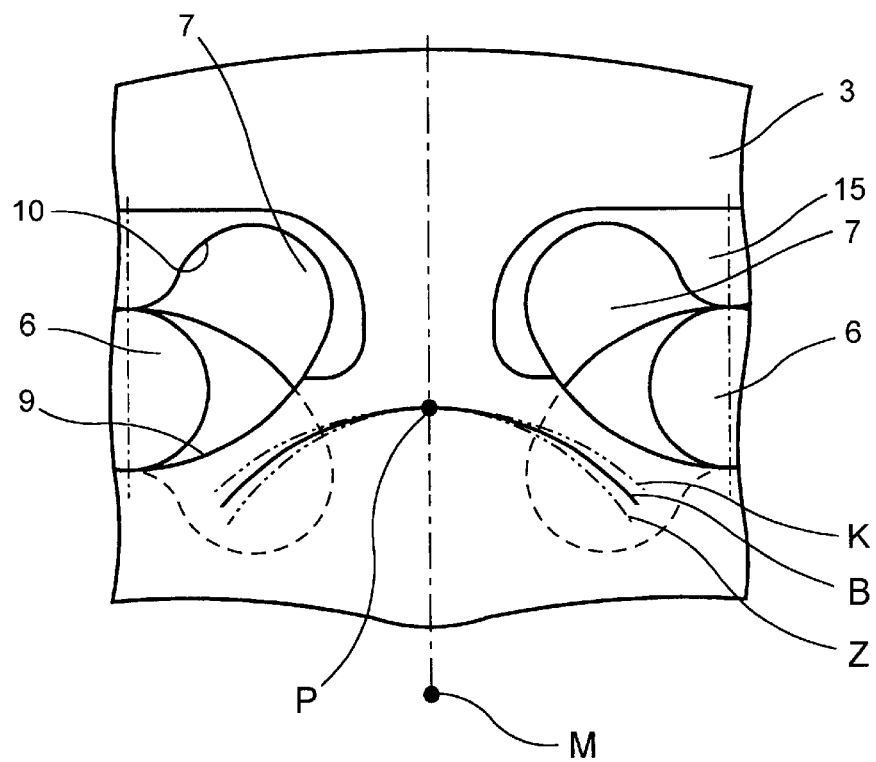
FIG. 5: shows an enlarged segment of the inertial mass from FIG. 4.

FIGS. 3, 4 and 5 schematically clarify more precisely the formation of path of motion B according to the invention. Path of motion B of a point P of inertial mass 3 has a radius of curvature R in the middle position of inertial mass 3. Radius of curvature R of path of motion B in the middle position is determined by the formula $$R = k\frac{L}{x^2},$$

L being the distance of curvature midpoint M from axis 1, x being the order of the exciting vibration and k being a factor in the range from 0.8 to 1.2. In this context, k is preferably different from 1.

The radius of curvature changes with increasing deflection of inertial mass 3 out of the middle position into the deflection position and, in so doing, decreases (radius of curvature R'). Consequently, the curvature of path of motion B increases. The curvature increases continuously and can be described by a monotonic function. Path of motion B can have the shape of a cycloid section Z. A cycloid is a curve which develops when a circle rolls along on a straight line. A point fixedly joined to the circle at a distance from its middle point describes a curve, composed of congruent pieces, as the circle rolls off on the straight line. The formation of the paths of motion of the inertial masses according to the present invention permits a particularly good tuneability of the dynamic-vibration absorber.

Furthermore, path of motion B lies in the region of a field F which, on one hand, is bounded by a circle K whose radius of curvature R is determined by the formula $$R = k\frac{L}{x^2},$$

where k=1.2, and on the other hand by a cycloid Z whose radius of curvature R in the middle position is determined by the formula $$R = k\frac{L}{x^2},$$

where k=0.8. At the same time, the circle and the cycloid are arranged in such a way that their paths coincide in the middle position, and the initial curvature of cycloid Z corresponds to the curvature of a circular path K, where k=0.8.

The damping action is further improved, in that path of motion B in a first section, adjacent to the middle position, lies in a first region of field F, the first region being bounded on one hand by a circle whose radius of curvature is determined by the formula $$R = k\frac{L}{x^2},$$

where k=1.0, and on the other hand by circle K whose radius of curvature is determined by the formula $$R = k\frac{L}{x^2},$$

where k=1.2. The circles are arranged in such a way that their paths coincide in the middle position. In a second section which is contiguous to the first section, path of motion B then runs in a second region of field F, the second region being bounded on one hand by the circle whose radius of curvature is determined by the formula $$R = k\frac{L}{x^2},$$

where k=1.0, and on the other hand by cycloid Z whose radius of curvature R in the middle position is determined by the formula $$R = k\frac{L}{x^2},$$

where k=0.8. The circle and cycloid Z are arranged, such that their paths coincide in the middle position (the circle dividing field F into two regions is not shown in FIG. 3). The formation of the path of motion, differing section-by-section, opens up new possibilities for further optimizing the damping action under the most varied conditions.

Inertial mass 3 executes a purely translatory movement relative to hub part 2. This is achieved by supporting each inertial mass 3 in axially parallel bolts 6, such a support also being described as a parallel bifilar or double suspension. Since, in addition, inertial mass 3 is a rigid body, each point P allocated to inertial mass 3 performs an identical movement along path of motion B running through the respective point P.

Rolling paths 8,9 of the hub part and of inertial mass 3 are constructed as follows. Beginning from a point P—which is allocated to inertial mass 3, shifts with inertial mass 3 along path of motion B and whose distance in the middle position of inertial mass 3 is twice as great from curvature midpoint M, allocated to the middle position, of the path of motion of point P as the distance of point P from axis 20 of bolt 6. First and second rolling paths 8,9 are designed such that, in each deflection position, bolt axis 20 is located on the geometric center of an imaginary connecting line V between curvature midpoint M allocated to the middle position, and each point of path of motion B of point P. The spatial design of first and second rolling paths 8,9 can be derived from this position of bolt axis 20, the rolling paths in each case being set apart from bolt axis 20 by bolt radius r.

What is claimed is:

1. A speed-adaptive dynamic-vibration absorber for a shaft rotatable about an axis, comprising:

a plurality of inertial masses; and a hub part with which the plurality of inertial masses are movably connected, the inertial masses circumferentially arranged around an entire periphery of the hub, each inertial mass, having a middle position in which the distance between the center of gravity of the inertial mass and the axis is at a maximum, each inertial mass being moveable back and forth relative to the hub part along a path of motion in deflection positions in which the distance of the center of gravity of the inertial mass changes with respect to the middle position;

wherein the path of motion has a radius of curvature which changes at least sectionally with increasing deflection of the inertial mass from the middle position.

2. The speed-adaptive dynamic-vibration absorber as recited in claim 1, wherein the at least one inertial mass is supported in the hub part by axially parallel bolts that are rotatable about a bolt axis, the bolts being allocated to first rolling paths of the hub part and second rolling paths of the inertial mass.

3. A speed-adaptive dynamic-vibration absorber for a shaft rotatable about an axism, comprising:
   a plurality of inertial masses; and
   a hub part with which the plurality of inertial masses are movably connected, the plurality of inertial masses being circumferentially arrayed about the axis, each of the plurality of inertial masses having a middle position in which the distance between the center of gravity of the inertial mass and the axis is at a maximum, the inertial mass being moveable back and forth relative to the hub part along a path of motion in deflection positions in which the distance of the center of gravity of the at least one inertial mass changes with respect to the middle position;
   wherein the path of motion has a radius of curvature which changes at least sectionally with increasing deflection of the inertial mass from the middle position,
   wherein circumferentially adjacent inertial masses are rounded off at ends facing one another, and are loosely in contact with one another, regardless of the deflection.

4. A speed-adaptive dynamic-vibration absorber for a shaft rotatable about an axis, comprising:
   at least one inertial mass; and
   a hub part with which the at least one inertial mass is movably connected, the at least one inertial mass, having a middle position in which the distance between the center of gravity of the inertial mass and the axis is at a maximum, the inertial mass being moveable back and forth relative to the hub part along a path of motion in deflection positions in which the distance of the center of gravity of the at least one inertial mass changes with respect to the middle position;
   wherein the path of motion has a radius of curvature which chances at least sectionally with increasing deflection of the inertial mass from the middle position,
   wherein the radius of curvature of the path of motion in the middle position is determined by the formula $$R = k\frac{L}{x^2},$$

L being the distance of curvature midpoint from the axis, x being the order of the exciting vibration and k being a factor in the range from 0.8 to 1.2.

5. The speed-adaptive dynamic-vibration absorber as recited in claim 4, wherein the radius of curvature decreases at least sectionally with increasing deflection of the inertial mass out of the middle position.

6. The speed-adaptive dynamic-vibration absorber as recited in claim 5, wherein the radius of curvature decreases continuously.

7. The speed-adaptive dynamic-vibration absorber as recited in claim 4 further comprising a plurality of inertial masses circumferentially arrayed about the axis.

8. The speed-adaptive dynamic-vibration absorber as recited in claim 5, further comprising a plurality of inertial masses circumferentially arrayed about the axis.

9. The speed-adaptive dynamic-vibration absorber as recited in claim 6, further comprising a plurality of inertial masses circumferentially arrayed about the axis.

10. The speed-adaptive dynamic-vibration absorber as recited in claim 4, wherein k lies in the range from 0.8 to 0.999 or 1.001 to 1.2.

11. The speed-adaptive dynamic-vibration absorber as recited in claim 4, wherein the path of motion has the shape of a cycloid section.

12. The speed-adaptive dynamic-vibration absorber as recited in claim 10, wherein the path of motion has the shape of a cycloid section.

13. The speed-adaptive dynamic-vibration absorber as recited in claim 4, wherein the path of motion lies in a field which is bounded on the one hand by a circle whose radius of curvature (R) is determined by the formula $$R = k\frac{L}{x^2},$$

where k=1.2, and on the other hand by a cycloid (Z) whose radius of curvature (R) in the middle position is determined by the formula $$R = k\frac{L}{x^2},$$

where k=0.8.

14. The speed-adaptive dynamic-vibration absorber as recited in claim 10, wherein the path of motion lies in a field which is bounded on the one hand by a circle whose radius of curvature (R) is determined by the formula $$R = k\frac{L}{x^2},$$

where k=1.2, and on the other hand by a cycloid (Z) whose radius of curvature (R) in the middle position is determined by the formula $$R = k\frac{L}{x^2},$$

where k=0.8.

15. The speed-adaptive dynamic-vibration absorber as recited in claim 12, wherein the path of motion in a first section adjacent to the middle position lies in a first region of the field, the first region being bounded on one hand by a circle whose radius of curvature (R) is determined by the formula $$R = k\frac{L}{x^2},$$

where k=1.0, and on the other hand by the circle (K) whose radius of curvature (R) is determined by the formula $$R = k\frac{L}{x^2},$$

where k=1.2.

16. The speed-adaptive dynamic-vibration absorber as recited in claim 15, wherein the path of motion in a second section, which is adjacent to the first section, lies in a second region of the field, the second region being bounded on one hand by the circle whose radius of curvature (R) is determined by the formula $$R = k\frac{L}{x^2},$$

where k=1.0, and on the other hand by the cycloid (Z) whose radius of curvature (R) in the middle position is determined by the formula $$R = k\frac{L}{x^2},$$

where k=0.8.

17. The speed-adaptive dynamic-vibration absorber as recited in claim 7, wherein the at least one inertial mass is supported in the hub part by axially parallel bolts that are rotatable about a bolt axis, the bolts being allocated to first rolling paths of the hub part and second rolling paths of the inertial mass.

18. The speed-adaptive dynamic-vibration absorber as recited in claim 4, wherein the at least one inertial mass is supported in the hub part by axially parallel bolts that are rotatable about a bolt axis, the bolts being allocated to first rolling paths of the hub part and second rolling paths of the inertial mass.

19. The speed-adaptive dynamic-vibration absorber as recited in claim 17, wherein a point (P) exists, allocated to the inertial mass, which shifts with the inertial mass along the path of motion, and whose distance in the middle position of the inertial mass is twice as great from the curvature midpoint, allocated to the middle position, of the path of motion of the point (P) as the distance of the point (P) from the bolt axis, and that the first and second rolling paths are designed in such a way that, in each deflection position, the bolt axis is located on the geometric center of an imaginary connecting line between the curvature midpoint, allocated to the middle position, and each point of the path of motion of the point (P).

* * * * *

UNITED STATES PATENT AND TRADEMARK OFFICE
CERTIFICATE OF CORRECTION

PATENT NO.    : 6,450,065 B1                                          Page 1 of 1
DATED         : September 17, 2002
INVENTOR(S)   : Eckel et al.

It is certified that error appears in the above-identified patent and that said Letters Patent is hereby corrected as shown below:

<u>Column 7,</u>
Line 8, change "axism" to -- axis --.

Signed and Sealed this

Twenty-second Day of April, 2003

JAMES E. ROGAN
*Director of the United States Patent and Trademark Office*